United States Patent [19]
Donaire Camacho et al.

[11] Patent Number: 6,135,619
[45] Date of Patent: Oct. 24, 2000

[54] DEVICE FOR FIXING A LIGHT UNIT ON A CAR BODY COMPRISING AN EXTENSIBLE SPRING

[75] Inventors: Juan Manuel Donaire Camacho; José Garcia Castilla, both of Créteil, France

[73] Assignee: Valeo Vision, Bobigny, France

[21] Appl. No.: 09/230,424

[22] PCT Filed: May 26, 1997

[86] PCT No.: PCT/FR97/00918

§ 371 Date: Nov. 5, 1999

§ 102(e) Date: Nov. 5, 1999

[87] PCT Pub. No.: WO98/54028

PCT Pub. Date: Dec. 3, 1998

[51] Int. Cl.[7] .................................................... F21V 21/28
[52] U.S. Cl. ........................... 362/288; 362/546; 362/549
[58] Field of Search .................................... 362/546, 549, 362/288, 369, 390, 285

[56] References Cited

U.S. PATENT DOCUMENTS 2,138,076  11/1938  Taylor et al. ............................ 362/372

FOREIGN PATENT DOCUMENTS

| 795 615 | 3/1936 | France . |
| 813 614 | 6/1937 | France . |
| 894 131 | 12/1944 | France . |
| 3803933 A1 | 8/1988 | Germany . |

*Primary Examiner*—Sandra O'Shea
*Assistant Examiner*—Hargobind S. Sawhney
*Attorney, Agent, or Firm*—Morgan & Finnegan, L.L.P.

[57] ABSTRACT

The invention relates to a fixing device for fixing a housing of a motor vehicle lighting or signalling device to the bodywork of the vehicle. The fixing device comprises a body having a portion that is elastically deformable in elongation connecting a fixing portion for fixing to the body work to a fixing portion for fixing to the housing, the fixing device having one of the two ends suitable for being engaged in an enclosure associated with the housing or with the bodywork so as to provide, in said enclosure, two degrees of freedom transverse to the elongation direction of the elastically-deformable portion.

10 Claims, 5 Drawing Sheets

DEVICE FOR FIXING A LIGHT UNIT ON A CAR BODY COMPRISING AN EXTENSIBLE SPRING

The present invention relates to a fixing device enabling a motor vehicle lighting and/or signalling device to be assembled to the bodywork of a motor vehicle, while taking up clearances due in particular to manufacturing tolerances.

For reasons to do essentially with appearance, car manufacturers have for several years been seeking to position signal lights and headlights more and more accurately so that they are completely integrated in the shape of a vehicle and do not have any play within their own housings.

In FR-A-2 719 269, the Applicant has already proposed a fixing device that enables the position of an attachment zone of a housing or "base" of the lighting and/or signalling device to be adjusted in three dimensions relative to the bodywork of the motor vehicle.

That known device essentially comprises two elements capable of sliding relative to each other, one of the elements being secured to the housing or base, and the other being fixed to the bodywork by means of a screw that co-operates with a nut. Means are provided for enabling the assembly to be held in a locked position.

Such a fixing device makes it possible to adjust the position of the housing relative to the bodywork in three independent directions. However, it cannot always be adapted to a wide variety of positioning defects, and in particular to an angular positioning defect between the surfaces of the housing and of the vehicle bodywork. Furthermore, that device uses a plurality of independent parts which need to be associated with one another in order to achieve fixing, thereby complicating assembly and increasing the risk of pieces being lost, and thus of losing the various clamping operations that are required when a light is mounted on the bodywork.

Another device, proposed in document DE-C-195 11 137, enables a housing for a signalling or lighting device to be fixed to the bodywork of a vehicle and comprises two snap-fastenable ends that are united by a moving spring which is guided in its elongation direction.

However, that known device does not provide positioning freedom in a plane perpendicular to the elongation direction and it adapts poorly to all types of positioning defect.

Furthermore, it is observed that in order to snap-fasten that device between the housing and the bodywork, it is necessary to apply pressure to the device in the spring-compression direction, and that in order to avoid the spring bending a system is provided for blocking the spring during mounting. That gives rise to a structure that is complicated and bulky, and to risks of the device breaking.

The object of the present invention is to propose a device for fixing a housing of a signalling or lighting device to the bodywork of a vehicle, the device having improved ability for taking up clearance.

Another object of the invention is to provide a fixing device which is simpler and quicker to mount.

The present invention provides a fixing device for fixing a housing of a motor vehicle lighting or signalling device to the bodywork of the vehicle, the device comprising a one-piece body possessing a fixing portion that is elastically deformable in elongation interconnecting a fixing portion for fixing to the bodywork and a fixing portion for fixing to the housing, the device being characterized in that one of the two fixing portions is suitable for being engaged in an enclosure associated with the housing or with the bodywork so as to provide, in said enclosure, two degrees of freedom transverse to the elongation direction of the elastically-deformable portion.

The device is also characterized in that the body is made of plastics material and includes in said elastically-deformable portion, a groove in which there is received a metal spring having a sinuous blade, said spring possessing, at at least one of its ends, at least one catch for engaging the material of the body.

More particularly, the device is characterized in that the fixing portion for fixing to the housing comprises a hollow head connected to the elastically-deformable portion by a narrower portion, which narrower portion is suitable for being engaged in an opening formed in a wall secured to the housing after snap-fastening through an open-ended passage that communicates laterally with said opening.

Also, the device is characterized in that the body also includes a collar that is separated from the head by a distance corresponding substantially to the thickness of said wall.

The device is also characterized in that the fixing portion for fixing to the bodywork presents a non-removable threaded rod suitable for passing through the bodywork and for co-operating with a nut, or in a variant, said portion is suitable for co-operating with a screw passing through the bodywork, or in another variant, said portion is suitable for co-operating with a bushing presenting a locking groove at the end of its outside thread and suitable for co-operating with a screw passing through the bodywork.

Other characteristics and advantages of the invention appear on reading the following description. This description is purely illustrative and non-limiting. It should be read with reference to the accompanying drawings, in which.

Figure 1:
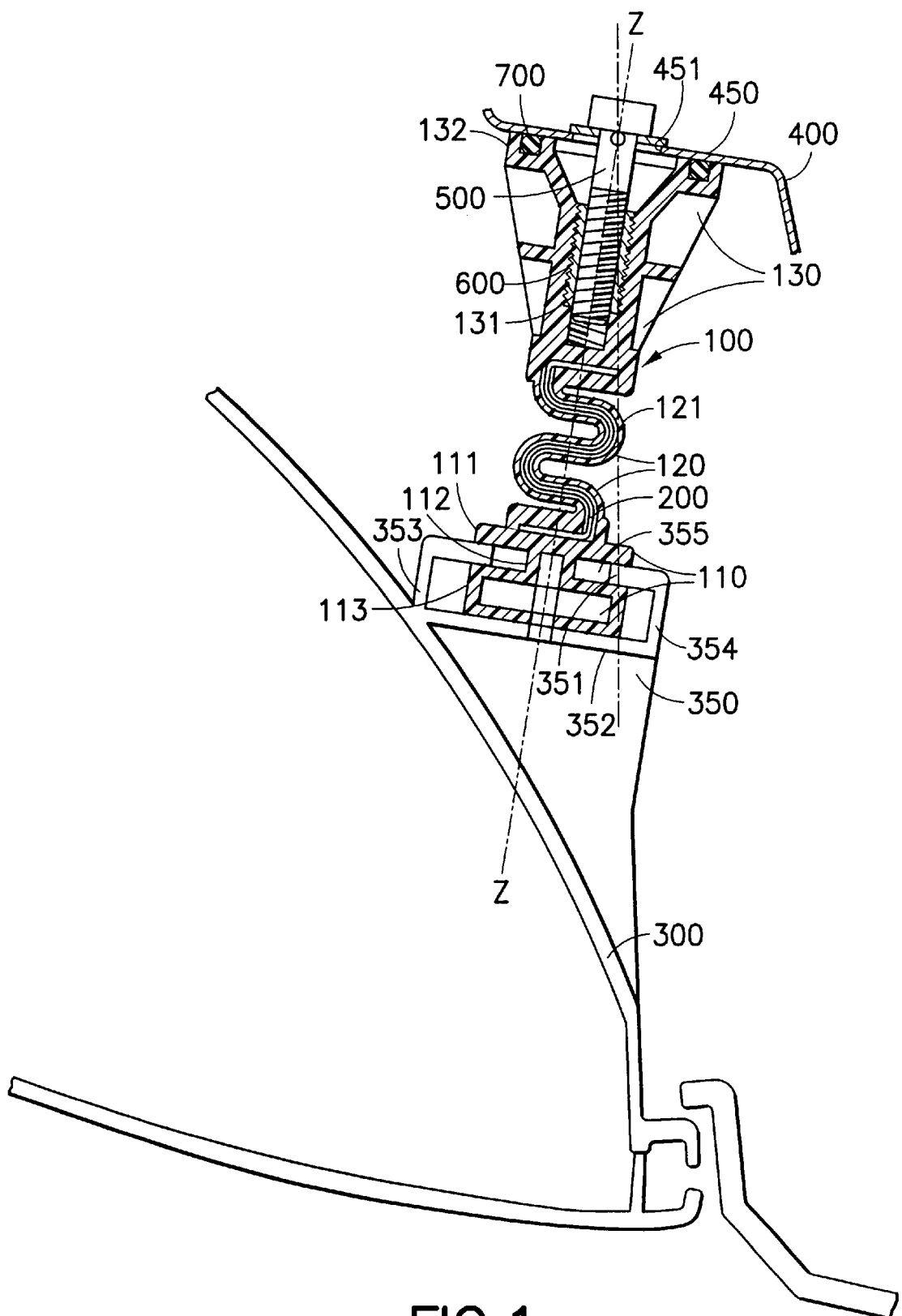
FIG. 1 is a plan view, partially in horizontal section, of a fixing device mounted between a housing for a signalling light and the bodywork of a vehicle.

FIG. 1 shows a fixing device that is designed to operate between an enclosure 350 secured to a housing 300 for a motor vehicle signalling light and an attachment zone 450 of the bodywork 400 of the vehicle.

The fixing device is constituted mainly by a body 100, a sinuous spring 200, a screw 500, and a bushing 600.

It has a main axis ZZ along which the body 100 of the device has three portions.

A portion 110 situated at one end of the body enables it to be connected to the housing 300 by being engaged in the enclosure 350.

A portion 130 or "base" situated at the other end of the body enables the body 100 to be fixed to the attachment zone 450 of the bodywork.

The central portion 120 of the body is designed to house a sinuous blade spring 200.

The portion 110 of the body is generally cylindrical about the axis ZZ. It has a collar 111 based on the portion 120 of the body, and a hollow disk 113 situated at a certain distance from the collar and extending parallel thereto.

In this case, the disk 113 has the same diameter as the collar. A smaller diameter portion 112 interconnects the disk 113 and the collar 111. This link portion 112 and the disk 113 are hollow and can accommodate a certain amount of elastic deformation.

Figure 3:
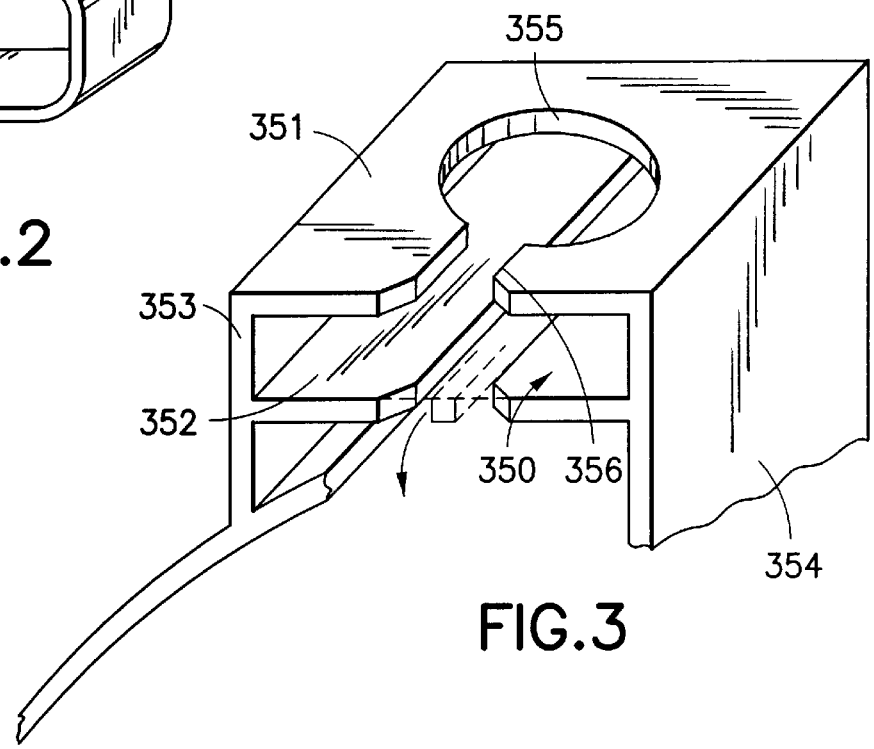
FIG. 3 is a perspective view of a portion of the light housing co-operating with the fixing device.

The enclosure 350 of the housing which co-operates with the portion 110 of the body 100 is shown in FIG. 3.

This enclosure is in the form of a rectangular parallelepiped. It has two plane faces 351 and 352 extending perpendicularly to the axis ZZ, and situated between two parallel flanks 353 and 354 extending from the housing 300 of the light.

The rear face 351 (on top in the figure) of the enclosure has a circular opening 355 in its center. The diameter of the opening 355 is smaller than the diameter of the collar 111 and of the disk 113 of the body 100. A passage 356 opening out in the face 351 enables the shaft 112 to be engaged in the opening 355 by elastic deformation or snap-fastening, thus allowing the portion 110 of the body 100 to move in a plane perpendicular to the axis ZZ because the transverse dimensions of the disk 113 are smaller than those of the enclosure 350, and because the section of the shaft 112 is smaller than the size of the opening 355.

Thus, according to a characteristic of the invention, the fixing device can be positioned freely in the enclosure of the light housing so as to adapt to differing amounts of play in the positioning of the housing transversely relative to the bodywork.

Preferably, the thickness of the head 113 is slightly smaller than that of the enclosure 350 so that once it has been inserted in the enclosure, the body 100 of the device is stabilized in a position that is perpendicular to the surface of the enclosure 350 of the housing.

In another variant, the space between the collar 111 and the head 113 is very slightly greater than the thickness of the rear face 351 of the enclosure, and the body of the device is thus held perpendicularly to the surface of the enclosure 350 of the housing.

The central portion 120 of the body 100 is sinuous in shape, and possesses an open hollow space 121 or groove, enabling it to house the spring 200. At each end of the spring 200, a catch 201 enables the spring to be retained inside the space 121.

The body 100 is made of thermoplastic material.

Thus, according to another advantageous characteristic of the invention, the body 100 is capable of tracking and adapting to the various elastic deformations of the spring 200.

Figure 2:
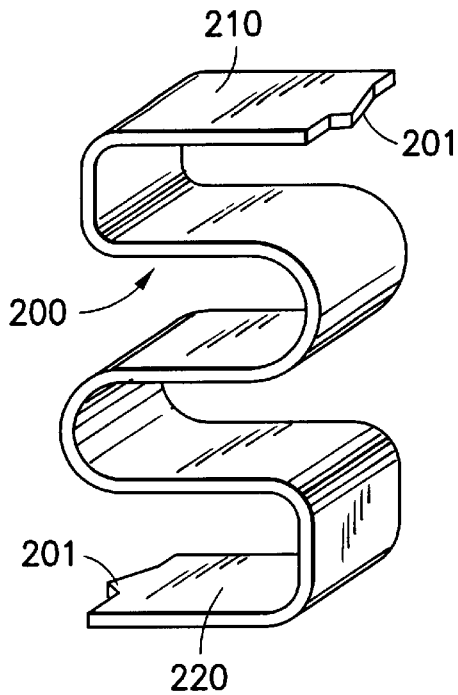
FIG. 2 is a perspective view of an element of the fixing device.

The sinuous blade spring 200 is shown in FIG. 2. It has four curved bends and two flat ends. On the free edge of each end, the spring has a respective one of the above-mentioned retaining catches 201.

The spring 200 is mounted and secured in the body 100 as follows.

The spring is presented sideways, along the hollow shape of the portion 120 of the body 100, and is then inserted by being pressed into said portion 120. The catches 201 retain it by engaging in the material of the body at the ends of its hollow shape 121.

The spring 200 is preferably made of steel.

Figure 5:
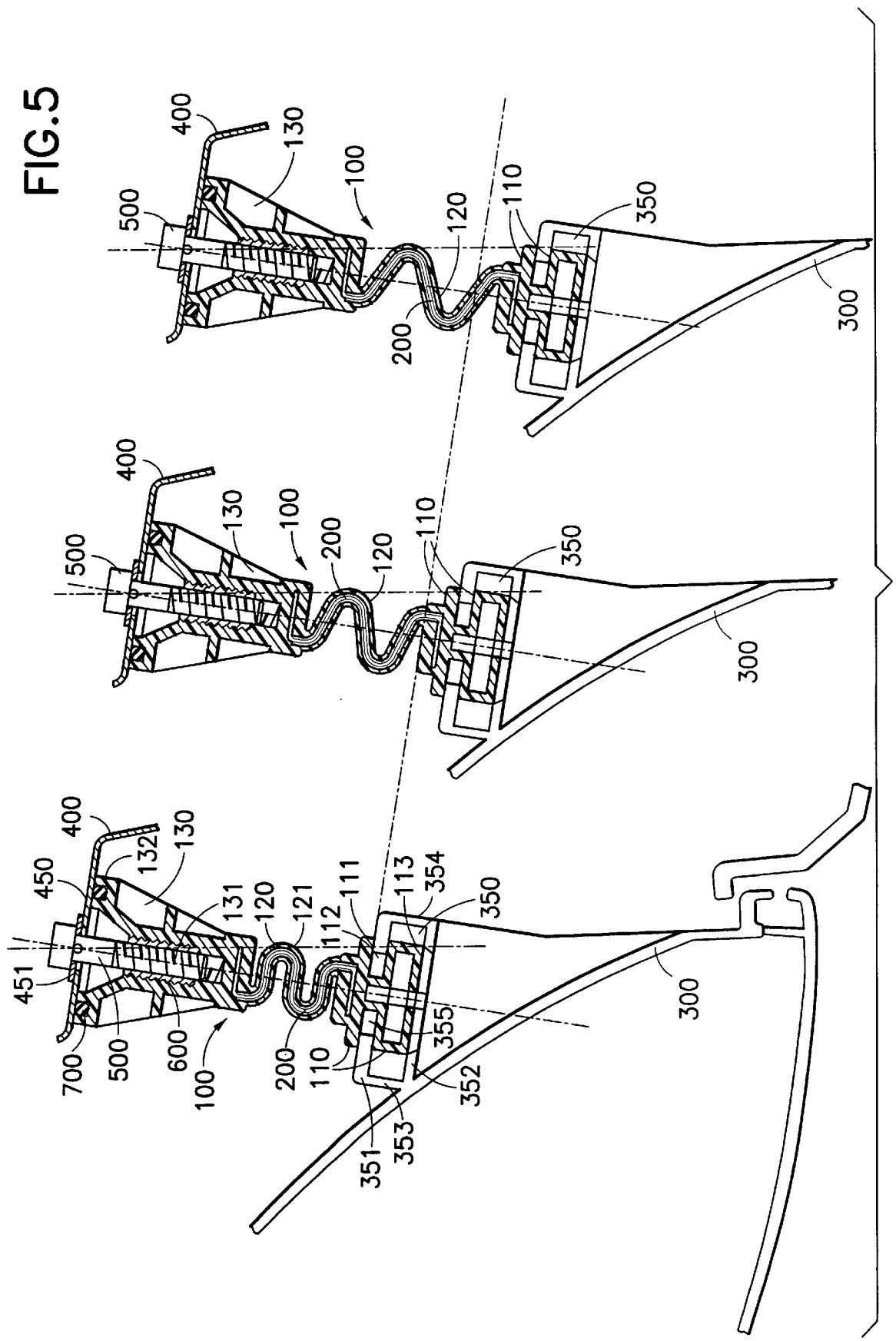
FIG. 5 is a view analogous to FIG. 1 showing the fixing device in three possible states.

According to another advantageous characteristic of the invention, and as shown in FIG. 5, the spring 200 enables the fixing device to be subjected to a wide variety of elongation along the axis ZZ and to accommodate a wide variety of bending, thereby absorbing forces during mounting.

If necessary, the spring 200 can be replaced in the event of failure.

Finally, at the other end of the fixing device, the portion 130 of the body 100 houses a bushing 600 and a sealing ring 700.

More precisely, the portion 130 of the body has a generally cylindrical tapped bore on the axis ZZ in which the bushing 600 is received. In the end face of the portion 130 there is formed a groove 132 which receives the sealing ring 700.

Figure 4:
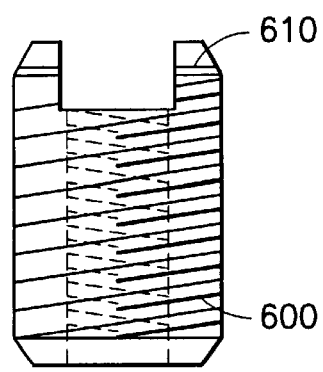
FIG. 4 is an elevation view of another element of the fixing device.

The bushing 600 is shown in FIG. 4. The outside diameter of the bushing corresponds to the diameter of the bore in the portion 130, while its inside diameter is tapped to co-operate with the screw 500. Thus, the bushing 600 is threaded on its inside and on its outside faces, and it preferably has a locking groove 610 at the top of the outside thread.

Once it has been screwed into the body 100, the bushing remains in place, being locked by the locking groove.

The bushing is advantageously made of brass, and its purpose is to prevent the portion 130 of the body which is made of plastics material from splitting when the screw 500 is tightened.

The attachment zone 450 on the bodywork 400 of the vehicle, as shown in FIG. 1, receives the portion 130 of the body of the device.

The attachment zone 450 is plane and has an ordinary circular opening 451 suitable for receiving the screw 500.

The fixing device as described above is used as follows when mounting or dismantling the fixing device.

The spring 200, the bushing 600, and the O-ring 700 are initially mounted on the body 100 of the device, as mentioned above.

The portion 120 of the body is snap-fastened in the enclosure 350 of the housing 300 of the light. The screw 500 is then engaged in the opening 451 in the bodywork, and it is screwed into the bushing 600 of the body 100. Under the effect of the screw 500 being tightened, the portion 120 of the body containing the spring 200 deforms, and the base 130 of the body comes to press against the attachment zone 450 of the bodywork, thus holding the housing 300 in place.

It will be observed that according to an advantageous characteristic of the invention, only two independent pieces are required to fix the housing 300 on the bodywork 400, namely the screw 500 and the body 100 which includes the spring 200, the bushing 600, and the O-ring 700.

Figure 6:
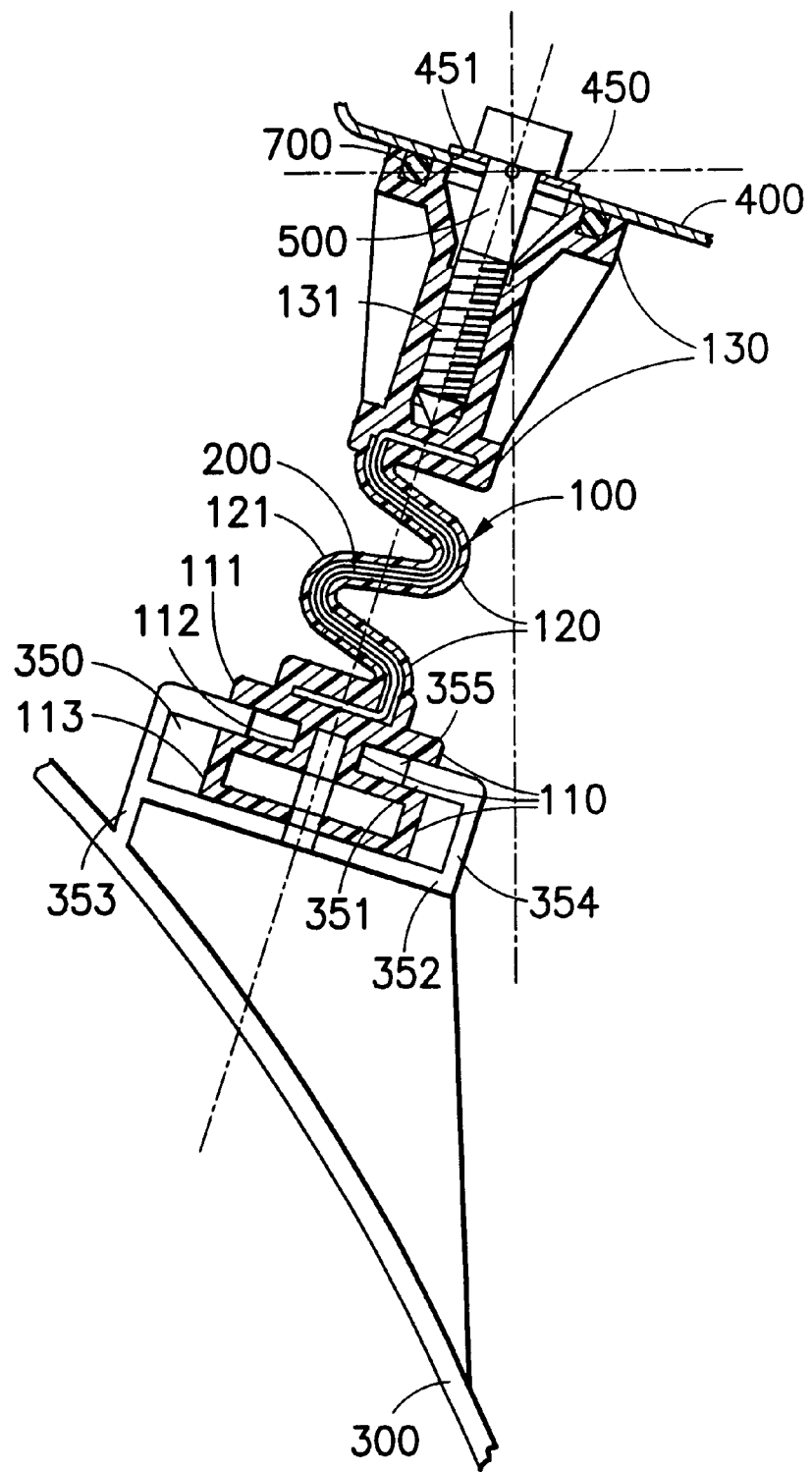
FIG. 6 is a plan view, partially in section, of a variant of the fixing device.

In a variant of the invention, as shown in FIG. 6, it is possible to make a fixing device that does not have a bushing. The screw 500 then co-operates directly with the body 100 of the device. The material from which the body 100 is made must be suitable.

Figure 7:
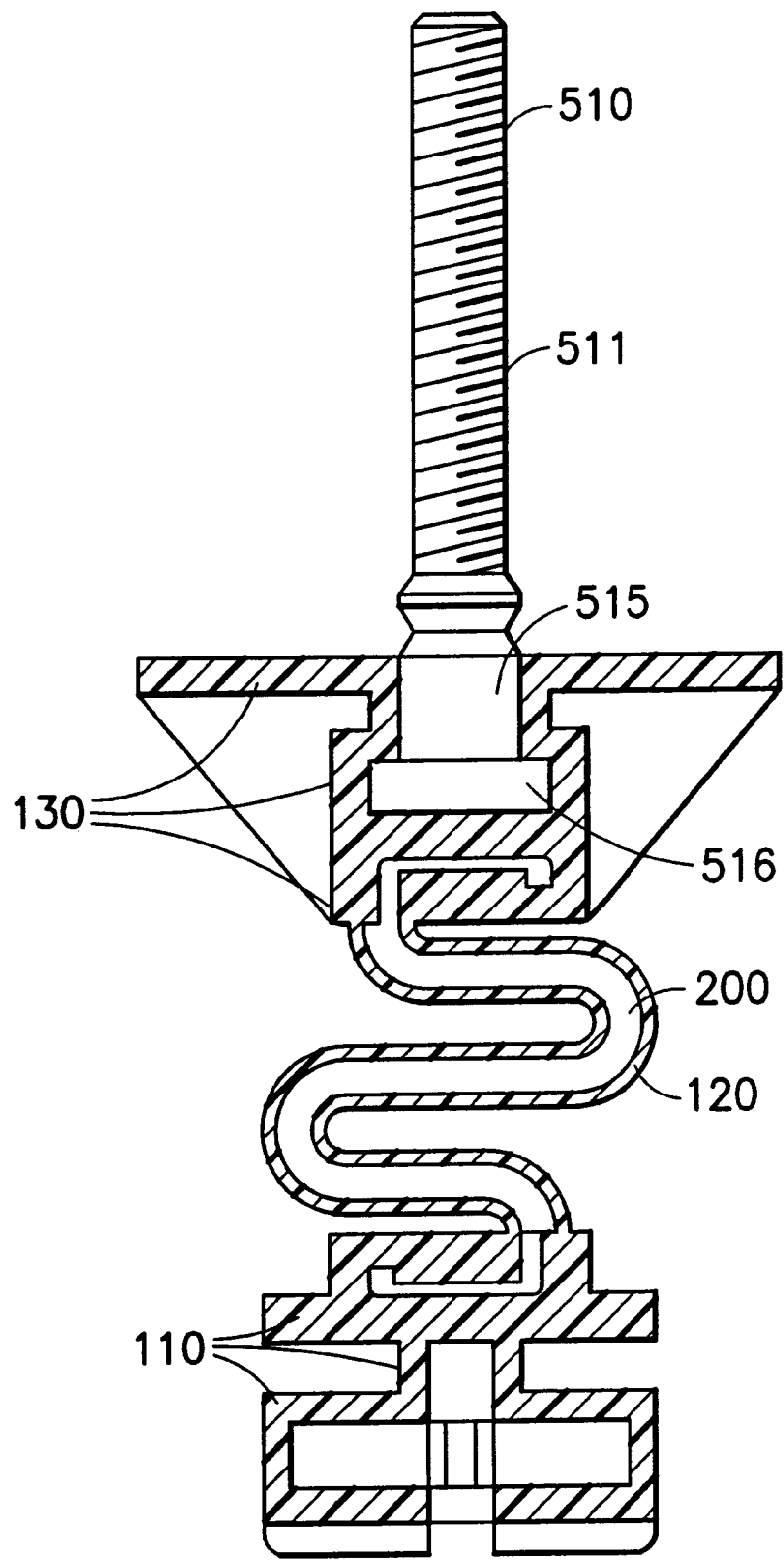
FIG. 7 is a section view, seen from above, of a variant of the fixing device.

In another variant of the fixing device, as shown in FIG. 7, the portion 130 of the fixing body has a bolt 510 that is not removable and that extends along the axis ZZ, so as to project from the end face of the portion 130 in an upward direction in FIG. 7. The bolt 510 has a threaded rod 511 and a zone 515 for attachment to the portion 130 of the body. At the end of the attachment zone 515 a head 516 serves to secure the bolt in the body 100 which is molded around the bolt.

In this variant of the invention, a signalling light is mounted to the bodywork of a vehicle by screwing a nut onto the threaded rod 511 of the device, after it has been inserted through the attachment zone 450 of the bodywork. This variant makes it possible to avoid using a bushing while also avoiding any danger of the body splitting while the fixing device is being mounted.

In other variants, it is possible to make the body 100 of the device and the spring 200, together with the bushing 600 out of different materials, and to assemble them using various techniques.

Thus, for example, the body 100 can be molded onto the bushing 600 and/or the spring 200, which then constitute inserts.

Furthermore, it is possible to avoid using a special spring 200 by adapting the material of the body 100, at least in the intermediate portion 120 thereof, e.g. by reinforcing it by incorporating reinforcing agents in the plastics material.

What is claimed is:

1. A fixing device for fixing a housing of a motor vehicle lighting or signalling device to the bodywork of the vehicle, the device comprising a one-piece body possessing a fixing portion that is elastically deformable in elongation interconnecting a fixing portion for fixing to the body work and a fixing portion for fixing to the housing, the device having one of the two fixing portions suitable for being engaged in an enclosure associated with the housing or with the bodywork so as to provide, in said enclosure, two degrees of freedom transverse to the elongation direction of the elastically-deformable portion.

2. A device according to claim 1, wherein the body is made of plastics material and includes in said elastically-deformable portion, a groove in which a metal spring is received.

3. A device according to claim 2, wherein the metal spring is a sinuous blade spring.

4. A device according to claim 3, wherein the metal spring has, at least one of its ends, at least one catch for engaging in the material of the body.

5. A device according to claim 1, wherein the fixing one piece body for fixing to the housing comprises a head connected to the elastically-deformable portion by a narrower portion, which narrower portion is suitable for being engaged in an opening formed in a wall secured to the housing after snap-fastening through an open-ended passage that communicates laterally with said opening.

6. A device according to claim 5, wherein the head is hollow.

7. A device according to claim 5, wherein the body also includes a collar that is separated from the head by a distance corresponding substantially to the thickness of said wall.

8. A device according to claim 5, wherein the fixing portion for fixing to the bodywork presents a non-removable threaded rod suitable for passing through the bodywork and for co-operating with a nut.

9. A device according to claim 5, wherein the fixing portion for fixing to the bodywork is suitable for co-operating with a screw passing through the bodywork.

10. A device according to claim 5, wherein the fixing portion for fixing to the bodywork is suitable for co-operating with a bushing presenting a locking groove at the end of its outside thread and suitable for co-operating with a screw passing through the bodywork.

* * * * *